United States Patent [19]

Welton et al.

[11] 4,338,704

[45] Jul. 13, 1982

[54] METHOD FOR PROCESSING BEEF TONGUES

[75] Inventors: Myron L. Welton; Gary L. Sheneman, both of South Sioux City, Nebr.

[73] Assignee: Iowa Beef Processors, Inc., Dakota City, Nebr.

[21] Appl. No.: 83,695

[22] Filed: Oct. 11, 1979

[51] Int. Cl.$^3$ .......................... A22B 5/16; A22C 17/12

[52] U.S. Cl. .......................................... 17/50; 17/21; 53/435; 53/440; 99/517; 99/589; 426/524

[58] Field of Search .......................... 17/50, 21, 51, 52; 99/584, 585, 586, 587, 589, 517; 83/15, 170; 53/435, 440; 426/524

[56] References Cited

U.S. PATENT DOCUMENTS 3,218,896 11/1965 McCormick ............................ 83/15
3,542,105 11/1970 Townsend .............................. 17/50
3,561,042 2/1971 Connick ................................. 17/50
3,926,080 12/1975 Bettcher ................................ 83/15

FOREIGN PATENT DOCUMENTS 541665 5/1957 Canada .................................... 17/50

OTHER PUBLICATIONS

Marshall Affidavit, dated 10-19-50.

*Primary Examiner*—Willie G. Abercrombie
*Attorney, Agent, or Firm*—Beveridge, DeGrandi & Kline

[57] ABSTRACT

Beef tongues from a kill floor are trimmed while at a temperature no less than about 92° F., rigidified by chilling them to about 35° to 45° F., and passed several times while in their rigidified condition through a skinning machine which grips a leading end of the skin and pulls the tongue at a velocity no greater than about 60 feet per second into a blade which slices a thin layer including the skin from the surface of the tongue. The skinned tongue is wrapped, boxed and frozen for shipment.

11 Claims, 1 Drawing Figure

TONGUES FROM KILL FLOOR

TRIM
NO LESS THAN 92°F.
REMOVE FAT, LYMPH NODES, SALIVARY GLANDS, GULLET AND HYOID BONE

CHILL
TO 35°–45°F.

SKIN
2 4 6 8 10

PACKAGE
WRAP
BOX
FREEZE

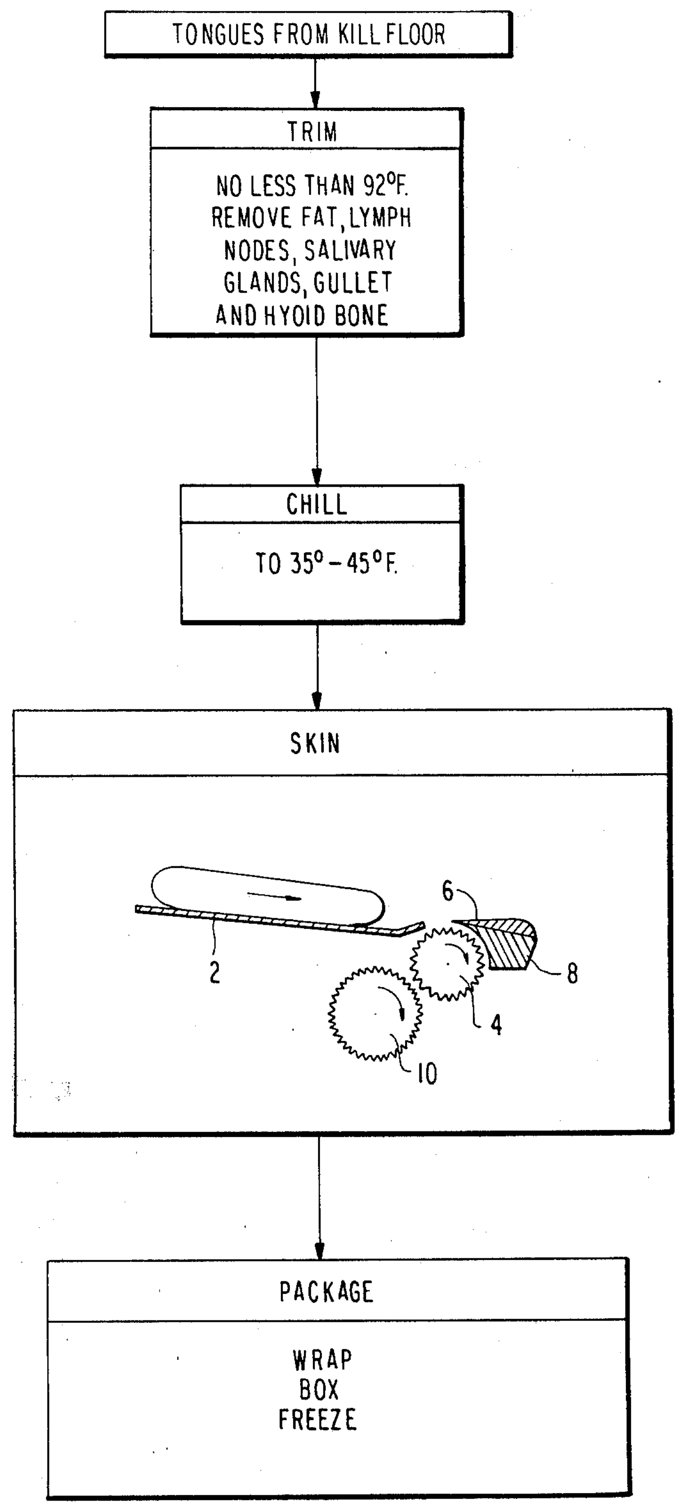
TONGUES FROM KILL FLOOR
TRIM
NO LESS THAN 92°F.
REMOVE FAT, LYMPH NODES, SALIVARY GLANDS, GULLET AND HYOID BONE
CHILL
TO 35°-45°F.
SKIN
6
2
8
4
10
PACKAGE
WRAP
BOX
FREEZE

METHOD FOR PROCESSING BEEF TONGUES

REFERENCE TO DISCLOSURE DOCUMENT

This application discloses and claims an invention which is the subject of Disclosure Document No. 076505 filed Dec. 15, 1978, the content of which is incorporated herein by reference.

BACKGROUND AND SUMMARY

This invention relates to a method for processing beef tongues.

Beef tongue has long been recognized as an appetizing and nutritious food source. Customarily, the external membrane or skin of the tongue is removed before the product is served, but such removal is made difficult because of the extreme tenacity between the skin and the internal red meat of the tongue. A common practice which reduces this problem has been to precook the tongue and then peel the skin from it. In other instances, knife trimming has been used.

The present invention provides a method for making skinned beef tongue in a labor-efficient manner which avoids excessive loss of red meat and provides for effective removal of the skin. According to the invention, the beef tongues are trimmed with a knife, rigidified by chilling and, while rigidified, the skin is sliced from the chilled tongue.

The trimming step is preferably performed at a temperature approximately equal to the normal body temperature of the animal in order to reduce excessive loss of red meat during trimming. The temperature during trimming should be at least 92° F. The trimming includes removal from the tongue of fat, lymph nodes, salivary glands, gullet and the hyoid bone. Ridigifying is preferably performed by chilling the tongue so that, when the skin is subsequently sliced from the tongue, the tongue will have a temperature of about 35°-45° F. The skin is preferably sliced from the tongue by supporting the tongue on a surface and moving it at a velocity no greater than about 60 feet per minute into a blade which has a cutting edge spaced above the surface. The tongue is moved into the blade by providing the machine with means for pulling on portions of the skin which have been sliced from but remain connected to the tongue.

BRIEF DESCRIPTION OF THE DRAWINGS

The drawing illustrates in schematic form a system for subjecting beef tongues to the processing method of the invention.

DESCRIPTION OF A PREFERRED EMBODIMENT

As shown in the drawing, beef tongues from a slaughterhouse kill floor are manually trimmed with knives to remove fat, lymph nodes, salivary glands, gullet and the hyoid bone. The tongues have not been artificially cooled or cooked prior to this trimming step and their temperature is no less than about 92° F. Above this temperature, the hyoid bone is more easily removed, and the amount of red meat lost during trimming is reduced. After trimming, the tongues are chilled to a temperature of about 35° to 45° F., to increase their rigidity. While in a chilled and rigidified condition, the tongues are passed through a skinning machine which slices a thin layer including the skin from the surface of the tongue.

The skinning machine is of conventional construction, such machines being disclosed in U.S. Pat. No. 3,769,903 and being sold under Model Nos. 400 and 500 SF by Townsend Engineering Company, Des Moines, Iowa. The machine includes an infeed support surface 2, a toothed, skin-gripping roll 4 and a skinning blade 6 mounted on a floating pressure shoe 8. A spring cartridge biases the arcuate surface of the pressure shoe 8 toward the roll 4. A stripping roll 10 which has coarser teeth than roll 4 is positioned closely adjacent to the roll 4. Means are provided for rotating both rolls 4 and 10 in a clockwise direction as shown, with the stripping roll 10 rotating at a faster rate than gripping roll 4.

The velocity of the skin-engaging surface of gripping roll 4 should be no greater than about 60 feet per minute. Prior machines of this type operate the roll 4 at about 115 rpm, providing a surface speed of about 90 feet per minute based on an approximate roll diameter of about three inches. Such machines tended to remove chunks of red meat with the skin, and turned the tongue crosswise from its desirable longitudinal orientation, causing it to lie parallel to the cutting edge and enabling it to rotate to remove multiple layers from the tongue. To avert this situation and to increase operator safety, the rotational velocity of roll 4 was halved and provided excellent results.

A tongue is skinned by placing it on surface 2, with its longitudinal axis lying perpendicular to the cutting edge of blade 6. The tongue is moved longitudinally by hand and into the blade 6, whereupon a leading portion of the skin is severed and biased by pressure shoe 8 into engagement with the teeth of gripping roll 4. The driven roll 4 pulls the tongue forwardly into the blade 6 which slices only the skin from the lower surface of the tongue without excessive removal of the red tongue meat. Roll 10 strips the skin from the gripping roll.

After each pass through the machine, the chilled tongue is reoriented to expose another surface thereof to the skinning blade during its next pass through the skinning machine. It is passed three to six times through the skinning machine until substantially all of the skin is removed. Preferably, four passes are made to remove the skin on the bottom, top, left and right sides of the tongue. Any remaining areas of skin are then removed from the tongue by a hand-held conventional blade knife or rotary power knife. The skinned tongues are wrapped in a stretch wrap plastic film which retards discoloration, avoids freezer burns, and promotes easy separation of the individual pieces. The wrapped tongues are boxed, frozen and shipped.

Persons familiar with this art will realize that the invention may take many forms other than the preferred embodiment disclosed herein. Therefore, it is emphasized that the invention is not limited only to the disclosed method but is embracing of modifications thereto and variations thereof which fall within the spirit of the following claims.

We claim:

1. A method of processing beef tongues, comprising the steps of increasing the rigidity of the tongue by chilling it, slicing the skin from one surface of the chilled tongue while the tongue is in an unfrozen state, said slicing step being performed by supporting the tongue on a surface and moving it into a blade which has a cutting edge spaced above the surface, and repeating the slicing step to remove the skin from other surfaces of the tongue.

2. The method of claim 1 including, subsequent to the slicing step, the further steps of wrapping and freezing the tongue.

3. The method of claim 1 or claim 2 wherein the slicing step is performed by moving the tongue into the blade at a velocity which is no greater than about 60 feet per minute.

4. The method of claim 1 or claim 2 including the step of trimming the tongue when it is at a temperature no less than about 92° F.

5. The method of claim 4 wherein the hyoid bone is removed from the tongue during the trimming step.

6. The method of claim 1 or claim 2 wherein the tongue is at a temperature of about 35°–45° F. during the slicing step.

7. The method of claim 6 including the step of trimming the tongue when it is at a temperature no less than about 92° F.

8. The method of claim 7 wherein the hyoid bone is removed from the tongue during the trimming step.

9. The method of claim 6 wherein the slicing step is performed by moving the tongue into the blade at a velocity which is no greater than about 60 feet per minute.

10. The method of claim 9 including the step of trimming the tongue when it is at a temperature no less than about 92° F.

11. The method of claim 10 wherein the hyoid bone is removed from the tongue during the trimming step.

* * * * *